No. 839,029. PATENTED DEC. 18, 1906.
V. POULSEN.
RECEIVING SYSTEM FOR WIRELESS TRANSMISSION OF SIGNALS.
APPLICATION FILED OCT. 2, 1905.

2 SHEETS—SHEET 1.

Witnesses:
Paul S. Ober.
Waldo M. Chapin

Inventor:
Valdemar Poulsen
by
Rosenbaum & Stockbridge
Attys

UNITED STATES PATENT OFFICE.

VALDEMAR POULSEN, OF COPENHAGEN, DENMARK.

RECEIVING SYSTEM FOR WIRELESS TRANSMISSION OF SIGNALS.

No. 839,029. Specification of Letters Patent. Patented Dec. 18, 1906.

Application filed October 2, 1905. Serial No. 280,978.

*To all whom it may concern:*

Be it known that I, VALDEMAR POULSEN, electrical engineer, and a resident of Steen Blichersvej 22, Copenhagen, Denmark, have invented a new and useful Receiving System for Wireless Transmission of Signals, which is fully set forth in the following specification.

The invention relates to a receiving system for wireless transmission of signals, and aims at obtaining a higher sensitiveness in the receiving apparatus by means of the principle known from the condensing-electroscope.

Different arrangements of the invention are shown schematically in Figures 1-4.

Figure 1:
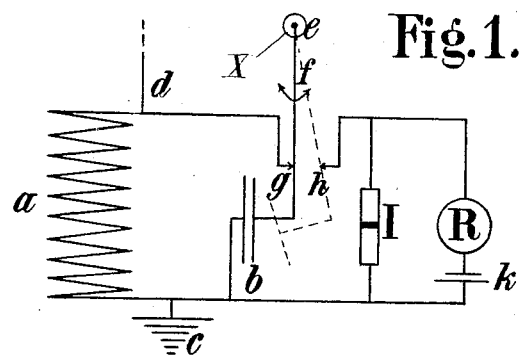

Referring to Fig. 1, $a$ is a coil the ends of which are connected to the condenser $b$. One end may also, eventually be connected to earth at $c$, and the other, eventually, to an antenna at $d$. One of the condenser $b$'s plates is fixed on an arm $f$ capable of turning on the point $e$. Through the motion of this arm, the condenser-plate in question may be brought nearer to or farther from the other plate, and at the same time, while being in the extreme positions, it also forms contacts at the contact-places $g$ and $h$ respectively. I is the wave-indicator (a coherer for instance). R is a relay and $k$ a battery.

The device works in the following manner: When vibrations are generated in the alternating circuit formed by the coil $a$ and condenser $b$ &c., a difference of potential in the respective condenser-plates will be found. If now, at the moment such a difference of potential is present, the movable plate is removed from the fixed one, by a local source of power, as for example, a power-shaft X, by which the plate is forcibly oscillated, the contact $g$ will cease, and owing to the decreasing capacity of the condenser, the potential of this plate will increase. When contact is effected at $h$, the condenser discharges through the wave-indicator, and the relay begins to act. The wave-indicator is here exposed to a greater energy than that which was available in the alternating circuit, the motion of the condenser-plate having supplied energy.

Figure 2:
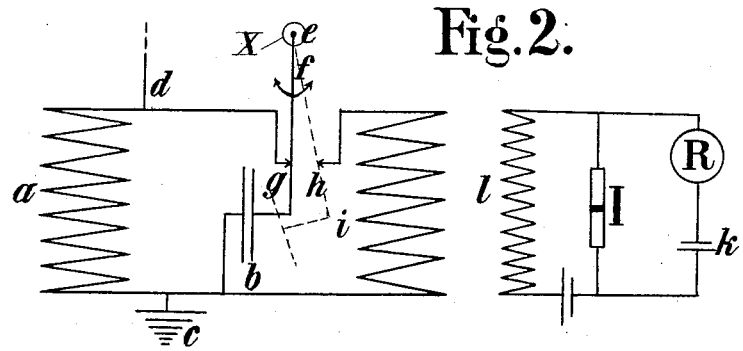

The diagram shown in Fig. 2 differs only from that shown in Fig. 1, by the condenser being made to discharge through a coil $i$ forming the primary of a transformer, the secondary of this being formed by a coil $l$ sending the current-vibrations to the wave-indicator.

Figure 3:
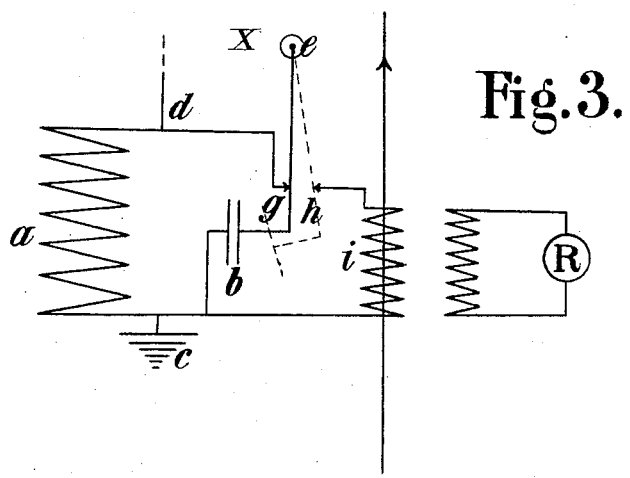

Referring to the diagram shown in Fig. 3, the wave-indicator is a magnetic detector, the magnetized wire being carried through the coil $i$.

These diagrams are merely examples, and the invention must be supposed to be employed in many different ways, the coil $a$ in Fig. 1, for instance, need not be connected directly to the receiving-antenna, but it may, for instance, form the secondary of a transformer in which the primary is connected to the antenna. Besides by altering the distance of the condenser-plates, which may be easily accomplished by means of a rotating system of plates, the variation of capacity may, of course, also be obtained by changing intermittently the dielectric employed, by intermittently inserting a conductive plate or by similar means, which in practice may also be easily accomplished by a rotating system in which for instance, plates made of different materials are inserted and removed from the space between the condenser-plates, or in a similar manner.

Figure 4:
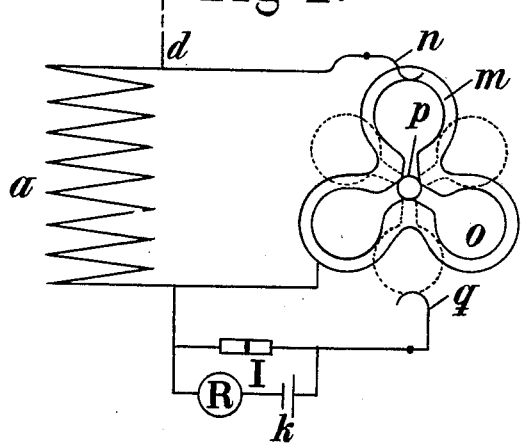

Fig. 4 shows schematically the arrangement of a condenser in which the variation of capacity is obtained by one of the condenser-plates rotating relatively to the other, the condenser-plate having a shape suitable for the purpose. In the drawings the fixed plate $m$ is shown connected to a coil $a$, the other end of which is connected to a contact-spring $n$. The movable-plate system is kept in motion through rotation of the shaft $p$. The condenser is charged at the position of the movable condenser-plate shown in full lines. By far the greatest charge of the condenser may be obtained by a certain outside impulse in the vibration-circuit formed by the coil $a$ and the condenser, if said vibration-circuit be tuned to be in resonance with the outside impulse. When the plate $o$ is brought into the position shown by dotted lines, the condenser has reached its lowest capacity, and in this position it is discharged through the wave-indicator I by touching the contact q. The plate o fixed on the shaft p is insulated from this, of course.

Having thus described my invention, I claim as new and desire to secure by Letters Patent—

In a receiving system for wireless transmission of signals, a condenser arranged to be charged by the received wireless impulses, and a local source of power connected to said condenser to change the capacity thereof, whereby the energy of the electric charge is multiplied.

In testimony whereof I have signed this specification in the presence of two subscribing witnesses.

VALDEMAR POULSEN.

Witnesses:
 VIGGO BLOM,
 JAN CHRISTOPHERSEN.